United States Patent [19]

Takahashi

[11] Patent Number: 5,058,992
[45] Date of Patent: Oct. 22, 1991

[54] METHOD FOR PRODUCING A DISPLAY WITH A DIFFRACTION GRATING PATTERN AND A DISPLAY PRODUCED BY THE METHOD

[75] Inventor: Susumu Takahashi, Kashiwa, Japan

[73] Assignee: Toppan Printing Co., Ltd., Japan

[21] Appl. No.: 276,469

[22] Filed: Nov. 25, 1988

[30] Foreign Application Priority Data

Sep. 7, 1988 [JP] Japan .................................. 63-222477
Sep. 7, 1988 [JP] Japan .................................. 63-222478

[51] Int. Cl.⁵ .......................... G02B 5/18; G03H 1/08
[52] U.S. Cl. .................................. 359/567; 359/558; 359/9
[58] Field of Search ........................ 350/162.11, 162.17, 350/162.24, 3.66, 162.12, 3.73, 320

[56] References Cited

U.S. PATENT DOCUMENTS

| | | | |
|---|---|---|---|
| 3,947,105 | 3/1976 | Smith | 350/162.18 |
| 4,017,158 | 4/1977 | Booth | 350/162.18 |
| 4,440,839 | 4/1984 | Mottier | 350/3.73 |
| 4,655,539 | 4/1987 | Caulfield et al. | 350/3.66 |

FOREIGN PATENT DOCUMENTS 60-156004  8/1985  Japan .

OTHER PUBLICATIONS

Strauss, *The Printing Industry*, section entitled, "Color Separation by Electronics", pp. 162-164, 1967.
Hishihara, "Recent Progress in Optical Integrated Circuits", Anritsu News, vol. 7, No. 36, Mar. 1988.
M. C. Hutley, "Diffraction Gratings", *Techniques of Physics*, pp. 13-19, 1982.

*Primary Examiner*—Bruce Y. Arnold
*Assistant Examiner*—James Phan
*Attorney, Agent, or Firm*—Bacon & Thomas

[57] ABSTRACT

A method for producing a display with a diffraction grating pattern comprising the steps of reading image data, assigning color for light exposure and moving a slit of an optical system to a position corresponding to the assigned color, moving an origin of an X-Y stage and setting initial data of the assigned color, reading data of an assigned address of the image data and opening a shutter of the optical system for light exposure when data of the assigned color exists, moving the X-Y stage to increase the address by one and repeating the data-reading and shutter-opening step until no further data exists, and changing the assigned color and repeating the above sequence of steps until no further color exists.

5 Claims, 11 Drawing Sheets

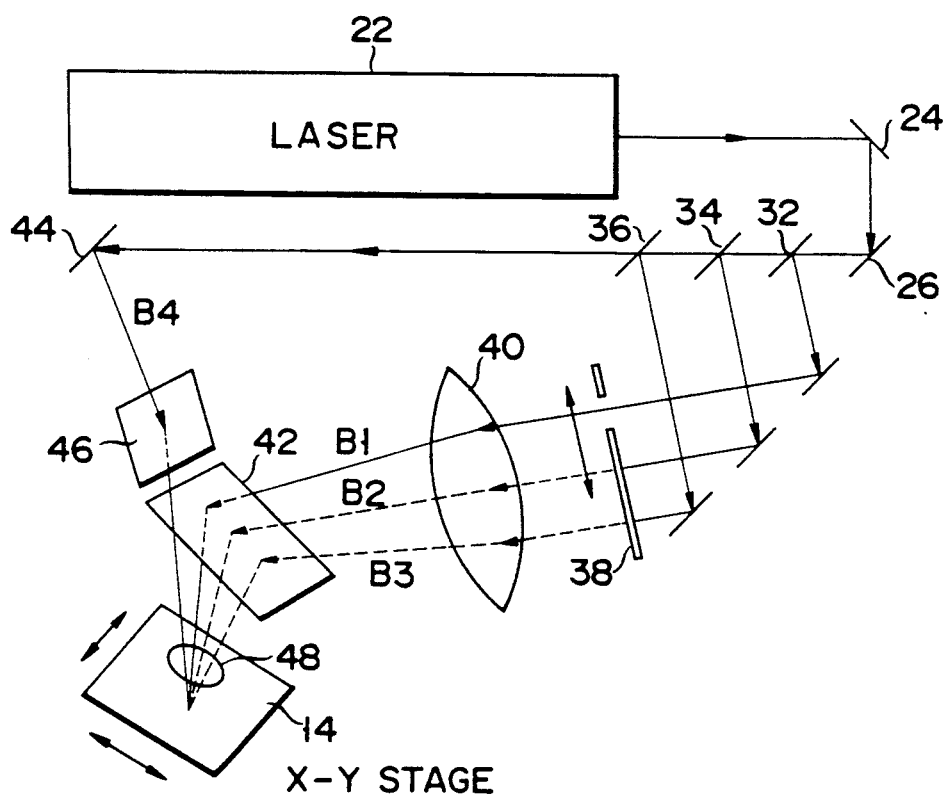
F I G. 2

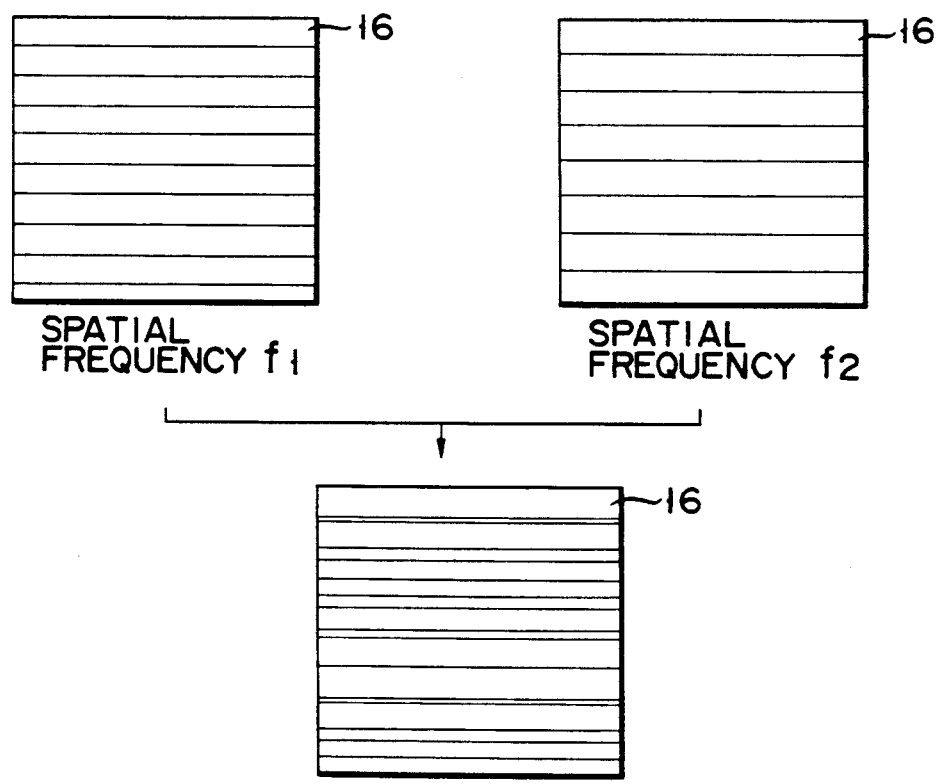
F I G. 10

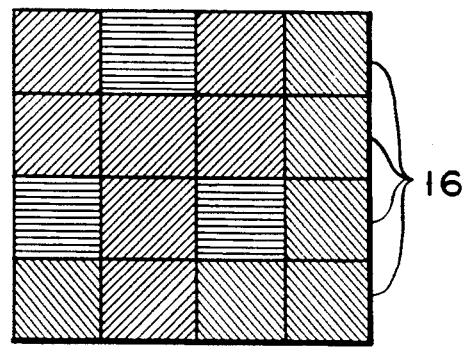
F I G. 11
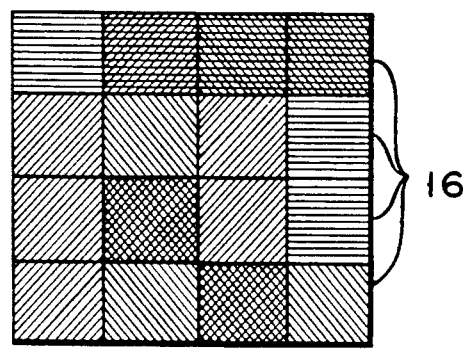
F I G. 12

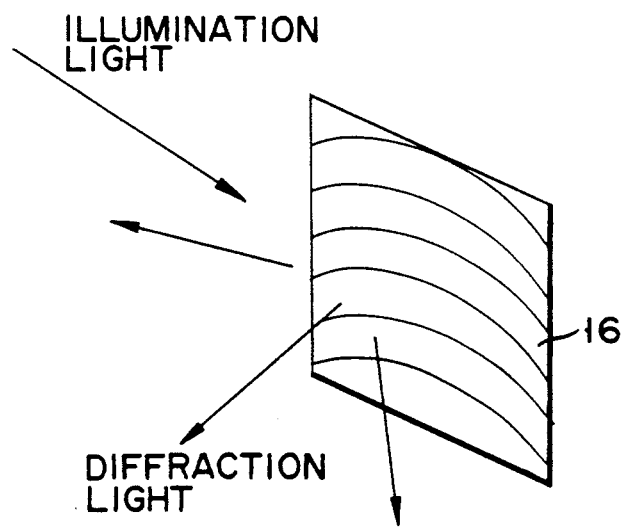
F I G. 13
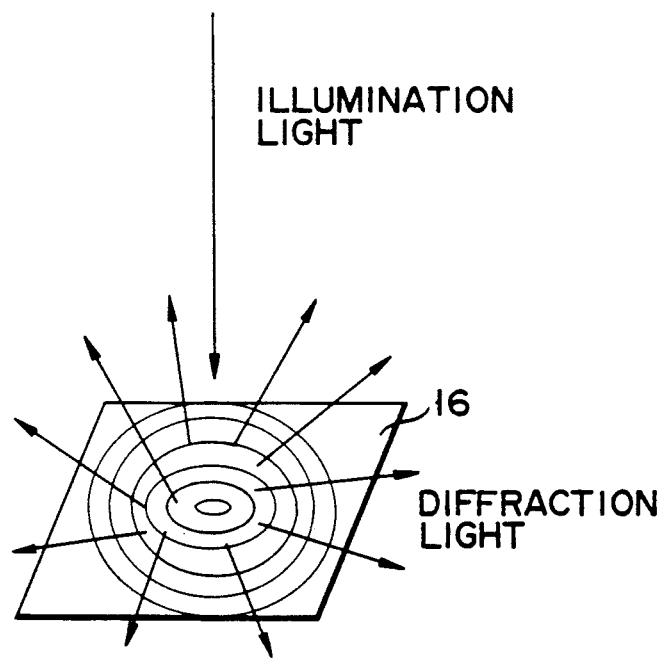
F I G. 14

000
METHOD FOR PRODUCING A DISPLAY WITH A DIFFRACTION GRATING PATTERN AND A DISPLAY PRODUCED BY THE METHOD

BACKGROUND OF THE INVENTION

1. Field of the Invention

The present invention relates to a method for producing a display by arranging a minute diffraction grating on a two-dimensional plane for each dot and to a display produced by this method.

2. Description of the Related Art

Japanese Patent Disclosure No. 60-156004 discloses a method for producing a display with a diffraction grating pattern formed by two-luminous flux interference. According to this method, a minute interference fringe pattern is sequentially light-exposed on a photosensitive film while changing its pitch, direction and light intensity.

According to this conventional method, varying the pitch, direction and light intensity of an interference fringe pattern requires that an optical system for an exposing head be moved for each event. Since the conventional method cannot have the optical system fixed, it is susceptible to an external vibration and cannot therefore form a highly-accurate diffraction grating.

Further, the conventional method cannot change the direction of the diffraction grating, formed in dots, for each dot. Furthermore, even if the conventional method can linearly form a diffraction grating, it cannot curvedly form a diffraction grating, so that the field of view of a display cannot be widened. In addition, since this method cannot form a diffraction grating that has a plurality of spatial frequencies for a single dot, the produced display cannot express an intermediate color.

SUMMARY OF THE INVENTION

Accordingly, it is the primary object of this invention to provide a method for producing a display with a diffraction grating pattern, which method is not susceptible to an external vibration and can therefore form a highly-accurate diffraction grating pattern.

It is the second object of this invention to provide a method for producing a display which has the direction of a diffraction grating varied for each dot.

It is the third object of this invention to provide a method for producing a display with a widened field of view by forming a dot-formed diffraction grating with curved lines.

It is the fourth object of this invention to provide a method for producing a display which can show an intermediate color, by giving a dot-formed diffraction grating a plurality of spatial frequencies.

It is the fifth object of this invention to provide display with a diffraction grating pattern which is produced by the above methods.

To achieve the first object, there is provided a method for producing a display with a diffraction grating pattern, which comprises the steps of:
reading image data of a color image;
assigning a light exposure for each of three wavelengths and moving a slit of an optical system to a position corresponding to the assigned color;
moving an origin of an X-Y stage and setting initial data of the assigned color;
reading data of an assigned address of the image data and opening a shutter of the optical system for light exposure when data of the assigned color exists;
moving the X-Y stage to increase the address by one and repeating the data-reading and shutter-opening step until no further data exists; and
changing the assigned color and repeating the above sequence of steps until no further image data exists.

According to the first method, first, color is assigned and a diffraction grating corresponding to this color is formed for each dot by moving the X-Y stage. When forming this diffraction grating is completed, the color is changed and a diffraction grating corresponding to the new color is similarly formed for each dot. Since the X-Y stage is moved for each color to form a diffraction grating, the optical system for forming a two-luminous flux interference fringe pattern can be fixed.

To achieve the second to fourth objects, there is provided a method for producing a display with a diffraction grating pattern, which comprises the steps of:
reading image data;
inputting visual field data to a computer;
moving an origin of an X-Y stage;
inputting an initial value of dot data;
determining a pitch, direction and curvature of a diffraction grating based on the dot data;
moving the X-Y stage to a position corresponding to the dot data based on the dot data;
delineating the diffraction grating using an electron beam exposing device; and
increasing an address corresponding to the dot data by one and repeating the above sequence of steps starting from the initial-value inputting step.

To achieve the fifth object, according to one aspect of this invention, there is provided a display with a diffraction grating pattern, which comprises:
a plane substrate; and
a diffraction grating pattern formed on a surface of the substrate and divided into a plurality of minute dots, pitches and orientations of the dots and spatial frequencies of diffraction gratings formed in the dots being varied as desired, directions of the diffraction gratings being varied dot by dot.

According to another aspect of this invention, there is provided a display with a diffraction grating pattern, which comprises:
a plane substrate; and
a diffraction grating pattern formed on a surface of the substrate and divided into a plurality of minute dots, pitches and orientations of the dots and spatial frequencies of diffraction gratings formed in the dots being varied as desired, each of the diffraction gratings being formed with curved lines.

According to a further aspect of this invention, there is provided a display with a diffraction grating pattern, which comprises:
a plane substrate; and
a diffraction grating pattern formed on a surface of the substrate and divided into a plurality of minute dots, pitches and orientations of the dots and spatial frequencies of diffraction gratings formed in the dots being varied as desired, each of the diffraction gratings having a plurality of spatial frequency components.

According to the display of this invention, the direction of the diffraction grating formed in the dots varies dot by dot, so that the display can be observed or viewed at various angles. Since the diffraction grating is formed with curved lines, its visual field can be increased. If the diffraction grating is formed with closed curved lines, the visual field is 360 degrees. In addition, since the diffraction grating has a plurality of spatial frequencies, an intermediate color can be expressed.

According to the second method, an electron beam exposing device is used so that various shapes of diffraction gratings can be delineated on an electron beam (hereinafter EB) resist. Further, with the use of such an electron beam exposing device, the direction of the diffraction grating can be changed for each dot and the diffraction grating can be formed with curved lines. Furthermore, it is possible to form a diffraction grating with a plurality of spatial frequencies.

BRIEF DESCRIPTION OF THE DRAWINGS

Other objects and advantages will be apparent from the following description taken in conjunction with the accompanying drawings in which:

FIG. 2 is a diagram illustrating an optical system for realizing the method of the first embodiment of this invention;

FIG. 10 is a diagram illustrating a dot having a diffraction grating with a plurality of spatial frequencies;

FIG. 11 is a diagram illustrating a pattern having the direction of a diffraction grating varying dot by dot;

FIG. 12 is a diagram illustrating a pattern with a diffraction grating having a plurality of directions;

FIG. 13 is a diagram illustrating a dot having a diffraction grating formed with curved lines; and FIG. 14 is a diagram illustrating a dot having a concentric diffraction grating.

DETAILED DESCRIPTION OF THE PREFERRED EMBODIMENTS

With reference to the accompanying drawings, a description will be given below of a method for producing a dot with a diffraction grating by rendering two beams from a laser to cross each other and create a standing wave interference pattern.

Figure 1:
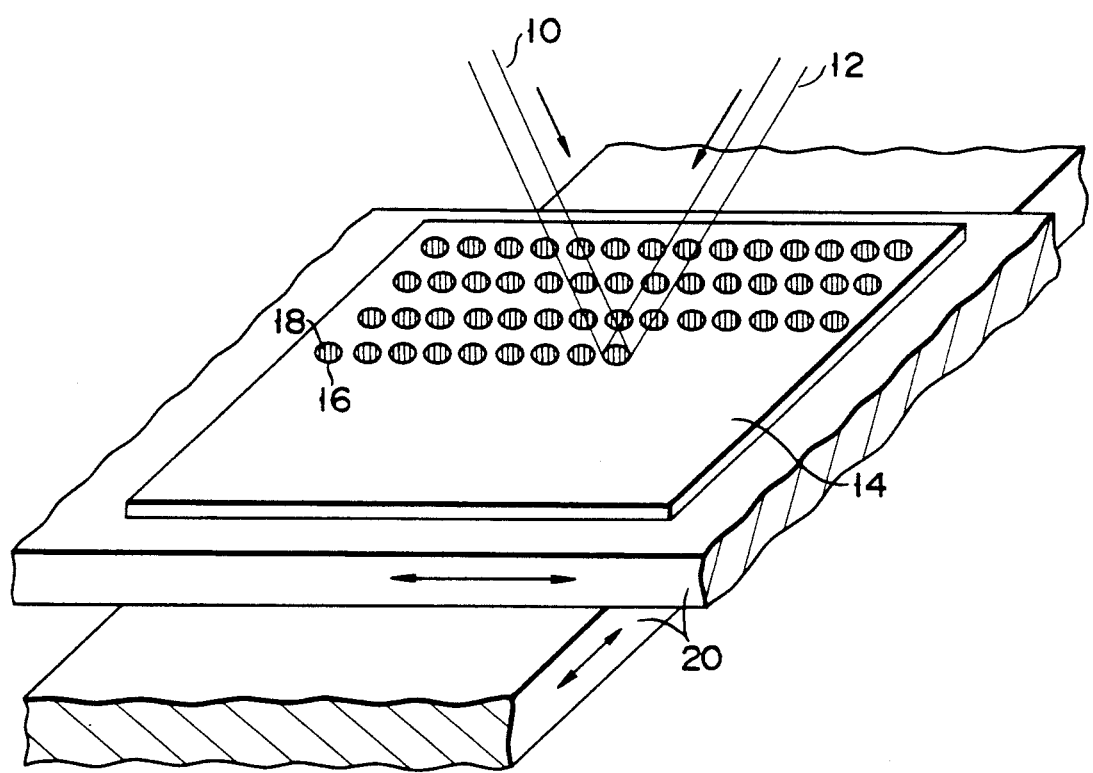
FIG. 1 is a diagram for explaining a method for producing a display having a diffraction grating pattern formed by a two-luminous flux interference according to the first embodiment of this invention.

According to the method of this invention, two beams from a laser are manipulated according to image data in a computer to form red (R), green (G) and blue (B) dots directly on a photosensitive material, and a display with a diffraction grating pattern is produced by a combination of the dots. As shown in FIG. 1, when two beams from a laser 10 and 12 are rendered to cross each other on a dry plate 14 in dot form, interference fringes 18 occur in dots 16. It is possible to change the period of the interference fringes by changing the angle at which two laser beams 10 and 12 cross each other. While moving an X-Y stage 20 in accordance with an instruction from the computer, the dots 16 with the interference fringes are formed on dry plate 14. In order to form three types of dots 16 representing three colors, red, green and blue, a laser beam is split into beams having three different incident angles. In this manner, three-color (R, G and B) spots are formed at arbitrary positions on dry plate 14 in accordance with an instruction from the computer.

FIG. 2 illustrates an optical system for forming dots on a dry plate 14. A laser beam emitted from a laser 22 changes its optical path at full reflection mirrors 24 and 26 and enters half mirrors 32, 34 and 36 by which it is separated into four beams B1, B2, B3 and B4. At this time, these four beams B1 through B4 are set to have the equal intensity. One of the first three beams B1, B2 and B3 is selected by a slit 38, and this selected beam is incident to dry plate 14 after passing through a lens 40 and a mirror 42. The laser beam B4, serving as a reference beam, is incident to dry plate 14 after passing through mirrors 44 and 46. These four beams B1 to B4 are adjusted to focus on one point and their incident angles to dry plate 14 are set to values calculated in advance in such a way that diffraction lights from diffraction gratings represent three colors, R, G and B.

Dry plate 14 is disposed on the X-Y stage and can be moved under the control of the computer. Laser beams B1 to B4 should pass through a shutter 48 before being incident to dry plate 14, and exposure/non-exposure to light is controlled by the opening/closing of this shutter 48.

Figure 3:
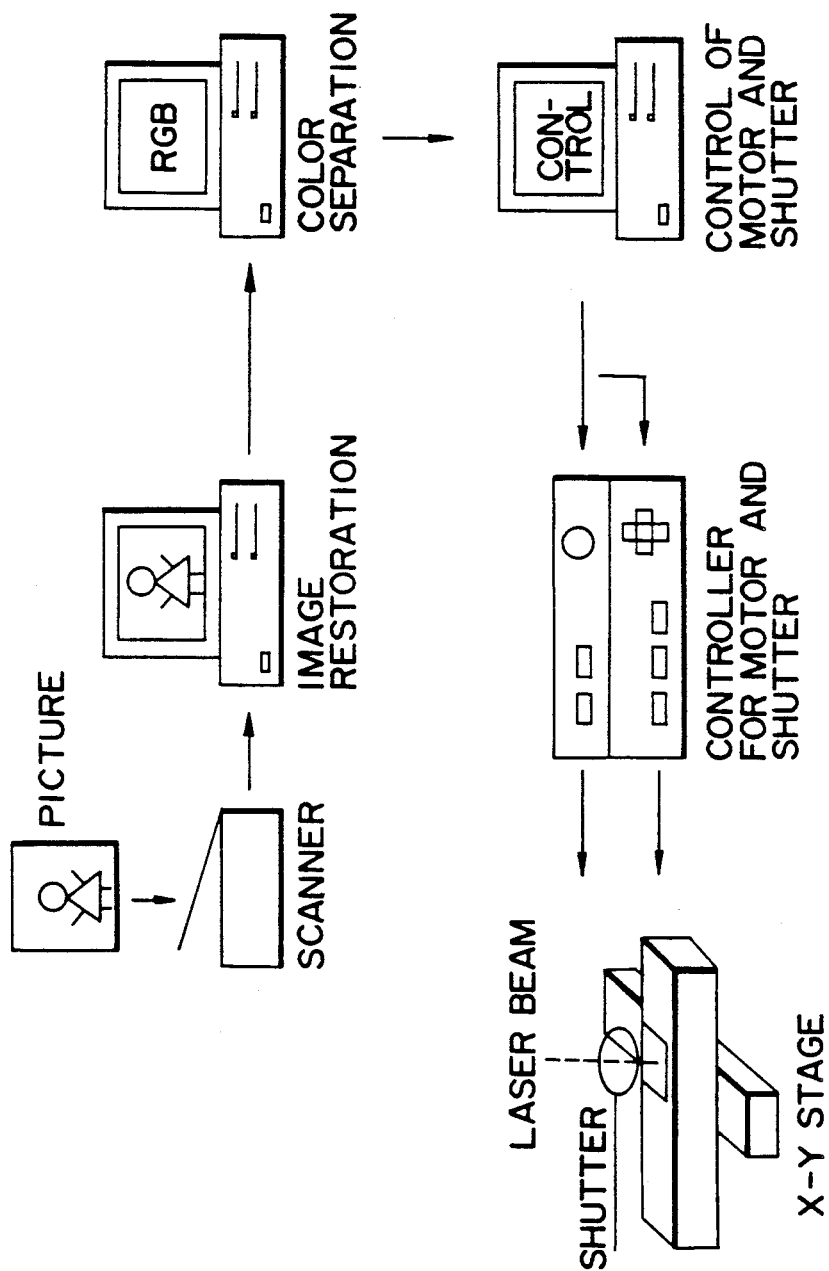
FIG. 3 is a diagram schematically illustrating the method of the first embodiment of this invention.
Figure 4:
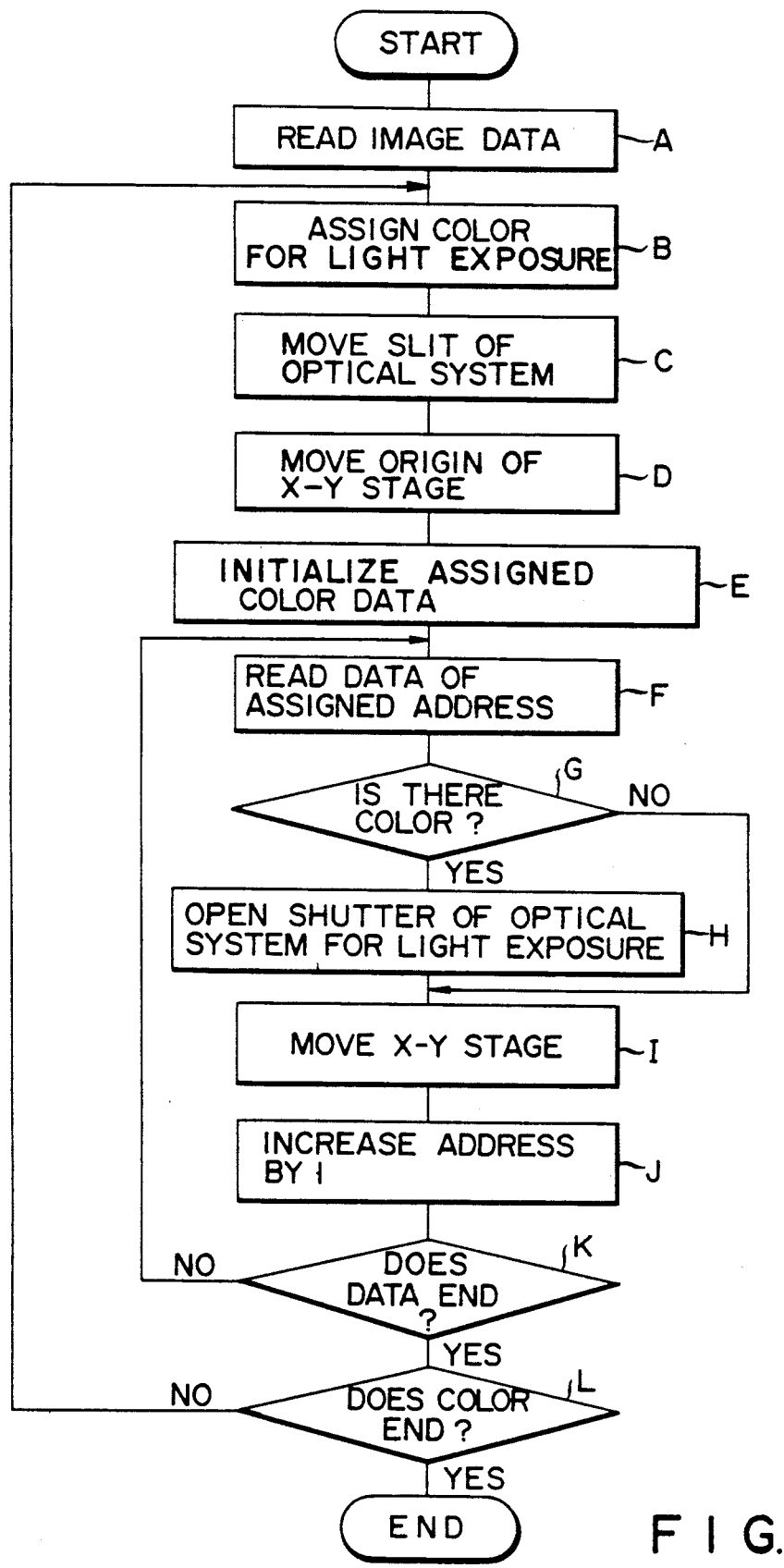
FIG. 4 is a flowchart for the method of the first embodiment of this invention.

Referring now to FIGS. 3 and 4, a description will be given of the method for producing a display with a diffraction grating pattern according to this invention. As shown in step A, first, image data is read by means of an image scanner and is entered in a computer. Since the image read by the image scanner has rugged edge portions, image correction is executed using the computer. This image correction is also executed in order to resize the image through enlargement or reduction. The corrected image data is stored, separated for each of colors R, G and B, on a floppy disk. Then, a color for light exposure is then designated, and slit 38 of the optical system is moved according to the designated color so as to extract only the designated one of laser beams B1 to B3 therethrough (steps B and C). In the subsequent steps D and E, the origin of the X-Y stage is moved and initial data of the designated color is set. Data at the designated address is then read out (step F), and it is discriminated whether or not the read data includes data of the designated color (step G). When the data of the designated color exists, the shutter of the optical system is opened to expose the dry plate to light for forming a diffraction grating corresponding to the designated color (step H). When, on the other hand, the data of the designated color does not exist, the dry plate is not exposed to light. At this stage, the step for forming a diffraction grating corresponding to color designated for a single dot is completed. Then, the X-Y stage is moved (step I), the address is incremented by one (step J), and it is determined whether or not data of the designated color has ended (step K). If it is not the end of the data, the flow returns to step F, and the sequence of steps F through K is repeated to form a diffraction grating pattern in a plurality of dots corresponding to the designated color.

When the data of the designated color has ended, the flow advances to step L where it is determined whether or not there is a further color for light exposure. When there is another color for light exposure, the flow returns to step B to assign the next color for light exposure, and the sequence of steps B to K is repeated. When there exists no further color, the display having a diffraction grating according to this invention is completed.

Figures 5A, 5B:
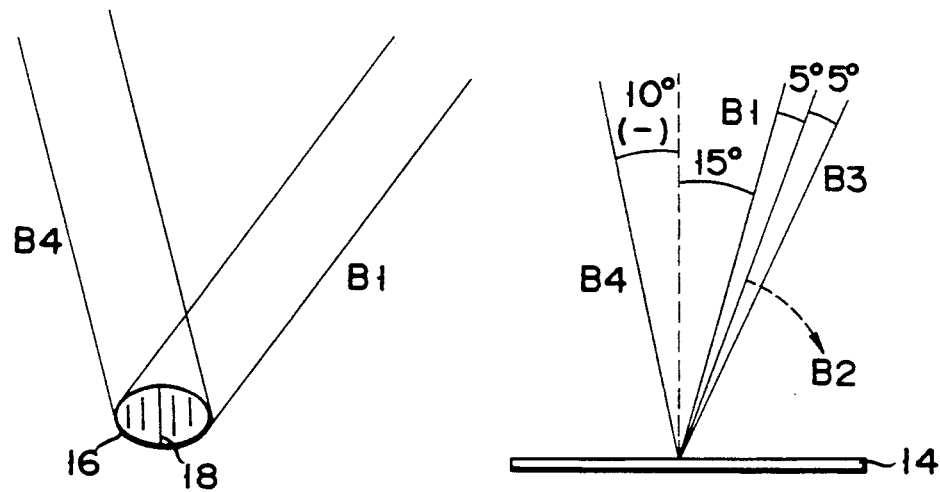
FIGS. 5A and 5B are diagrams for explaining a diffraction grating of a display of this invention.
Figure 6:
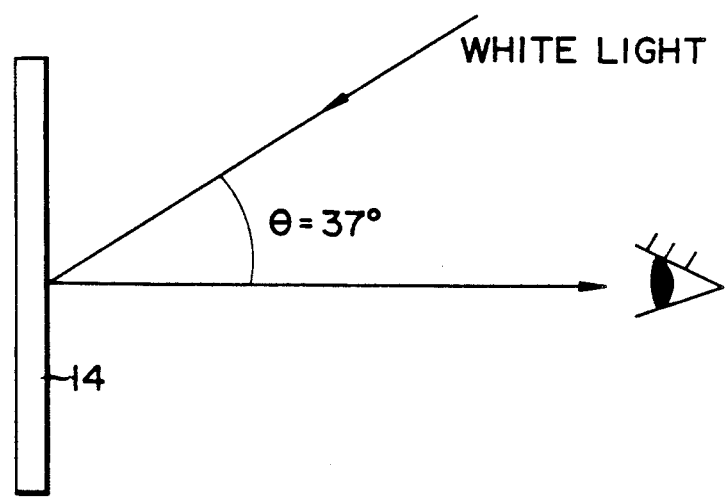
FIG. 6 is a diagram for explaining how to observe the display of this invention.

According to this invention, two beams from a laser cross each other on dry plate 14 as shown in FIG. 5A, dot 16 having an interference fringe 18 formed by the beams is recorded, and an image is formed by a collection of such dots 16. As shown in FIG. 5B, a red dot is formed by a combination of laser beam B4 incident to dry plate 14 at an angle of −10 degree and laser beam B1 incident at an angle of 15 degree. The spatial frequency of the interference fringe formed by laser beams B1 and B4 is 944/mm, which is derived as follows:

$$(\text{Sin } 10° + \text{Sin } 15°)/(457.9 \times 10^{-6}) = 944/mm.$$

A green dot is formed by a combination of laser beam B4 incident to dry plate 14 at an angle of −10 degree and laser beam B2 incident at an angle of 20 degrees. The spatial frequency of the interference fringe formed by laser beams B2 and B4 is 1126/mm, which is derived as follows:

$$(\text{Sin } 10° + \text{Sin } 20°)/(457.9 \times 10^{-6}) = 1126/mm.$$

A blue dot is formed by a combination of laser beam B4 incident to dry plate 14 at an angle of −10 degree and laser beam B3 incident at an angle of 25 degrees. The spatial frequency of the interference fringe formed by laser beams B3 and B4 is 1302/mm, which is derived as follows:

$$(\text{Sin } 10° + \text{Sin } 25°)/(457.9 \times 10^{-6}) = 1302/mm.$$

In order to reproduce the red dot to red, the green dot to green and the blue dot to blue, dry plate 14 is irradiated with white light from the above at an angle of 37 degrees and this dry plate is viewed from the direction normal to the plate. The wavelengths of the primary diffraction beams which are generated by the interference fringes having the spatial frequencies of 944/mm, 1126/mm and 1302/mm and come in the view direction are respectively 637 nm (for red light), 534 nm (green light) and 462 nm (blue light). These values are derived as follows:

Sin 37°/944 = 637 nm,
Sin 37°/1126 = 534 nm,
Sin 37°/1302 = 462 nm.

The dry plate having thus formed diffraction gratings can be used as a master plate for a copying occasion. Copying is executed using the well-known embossing method..

According to this embodiment, a dot having a diffraction grating is formed for each color using an X-Y stage, so that it is unnecessary to move the optical system, thus ensuring the formation of a highly-accurate diffraction grating pattern. Providing a highly-accurate diffraction grating pattern means that a clear display can be produced.

Since a diffraction grating pattern is formed using an X-Y stage and a computer, it is possible to provide a finer pattern with a fine hue, which is constituted by fine dots. Such a display can be used for security checking.

Further, since image data in a computer can be reproduced as it is using the computer, the overall production process can be simplified.

Figure 7:
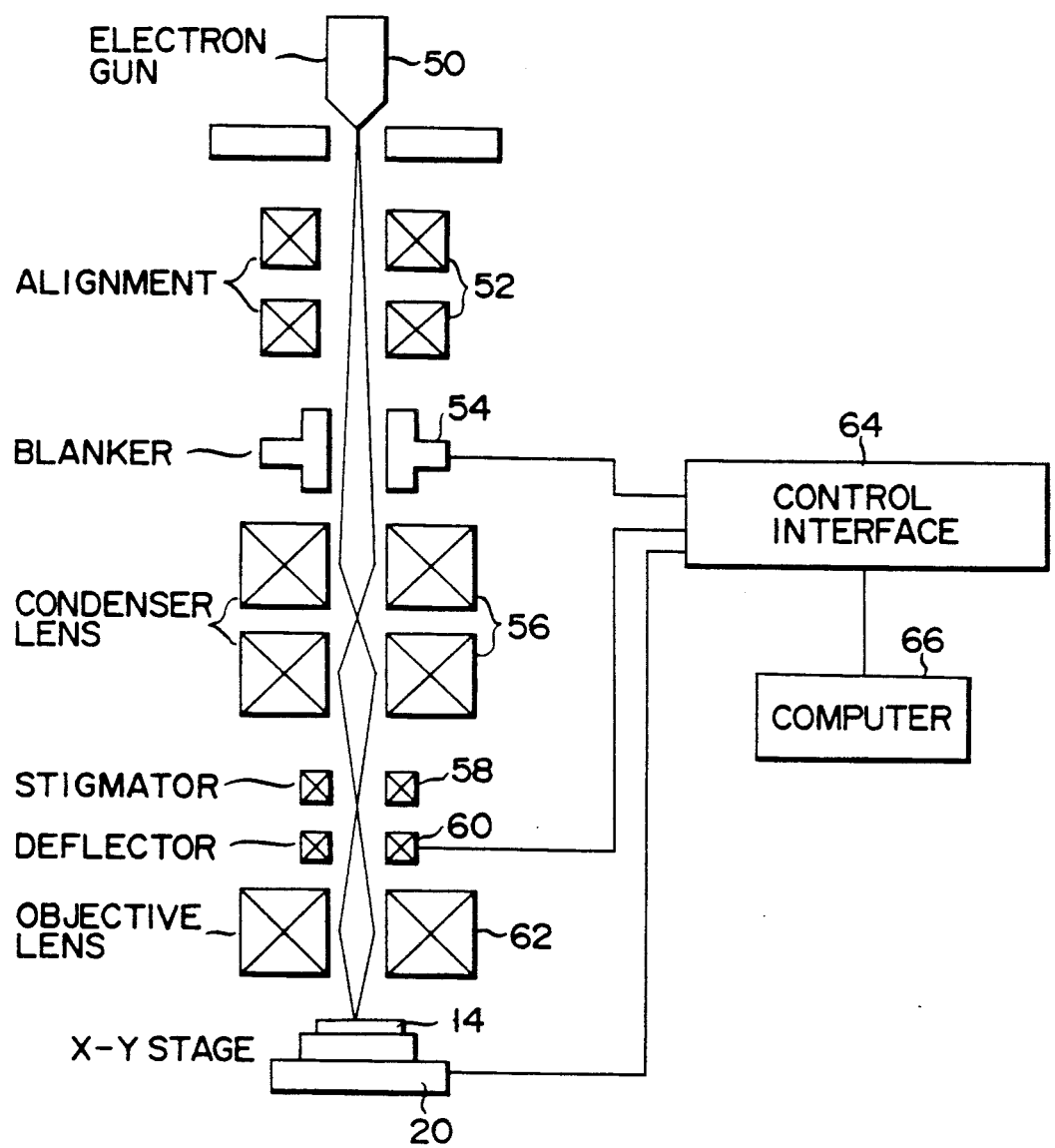
FIG. 7 is a schematic diagram of an apparatus for producing a display with a diffraction grating according to the second embodiment of this invention.
Figure 8:
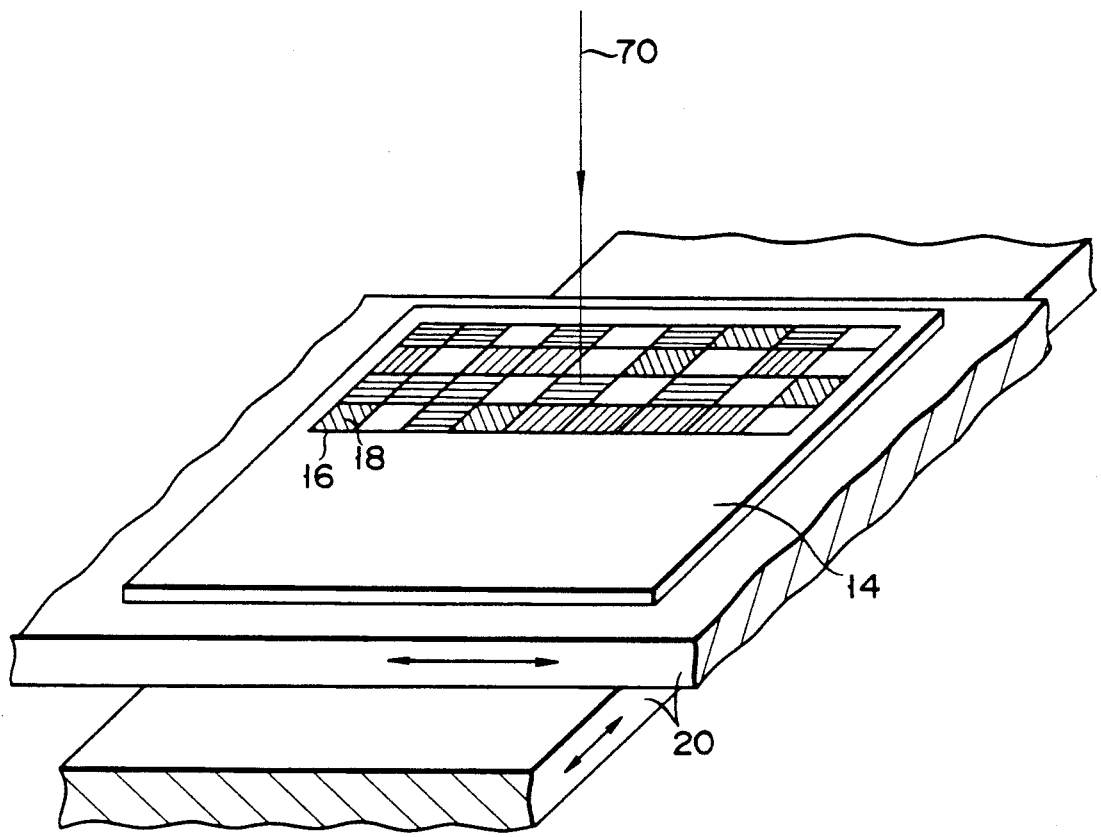
FIG. 8 is a diagram illustrating an EB resist placed on an X-Y stage.
Figure 9:
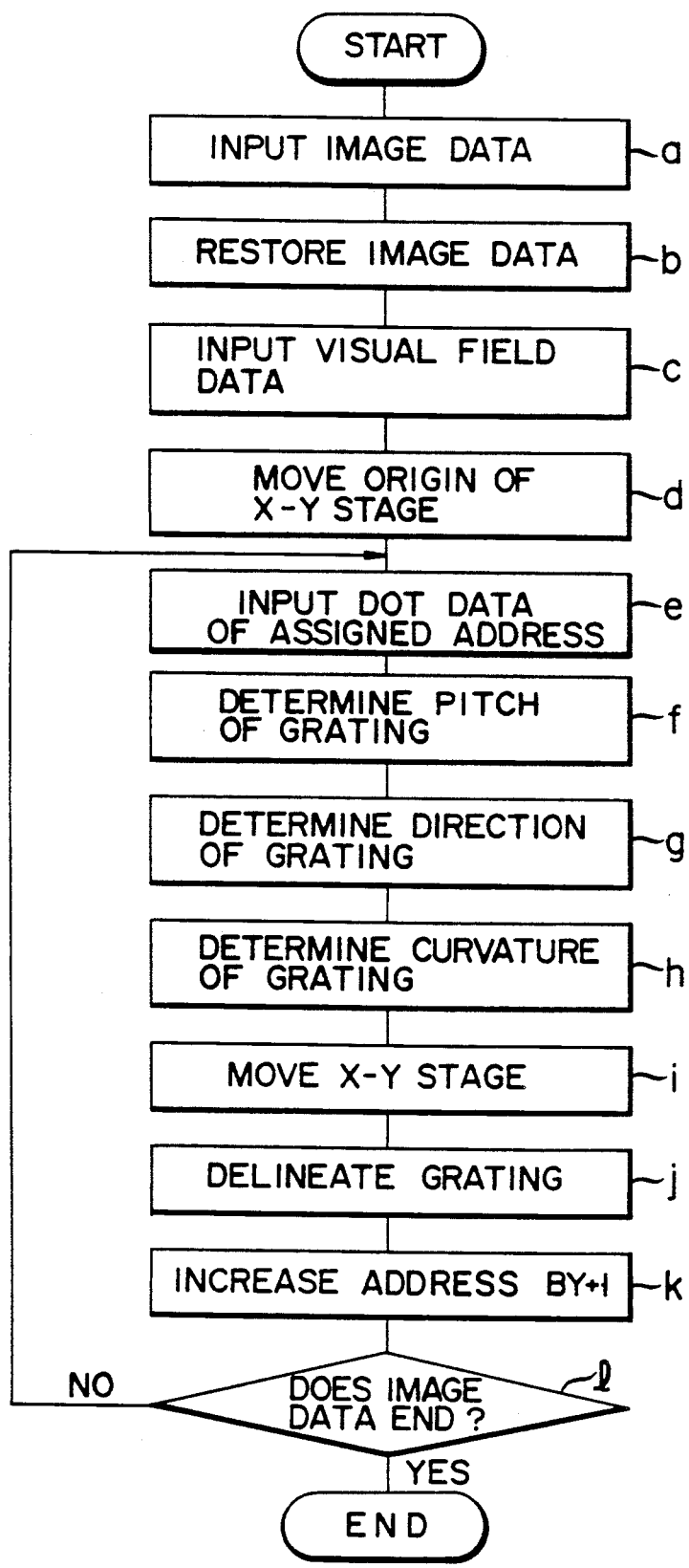
FIG. 9 is a flowchart for a method for producing a display with a diffraction grating according to the second embodiment of this invention.

Referring now to FIGS. 7 to 9, a description will be given of the method for producing a display with a diffraction grating pattern according to this invention, by using an electron beam exposing device.

As shown in FIG. 7, the electron beam exposing apparatus comprises an electron gun 50, an alignment 52, a blanker 54, a condenser lens 56, a stigmator 58, a deflector 60, an objective lens 62 and an X-Y stage 20. On the X-Y stage 20 is placed EB resist (dry plate) 14. Blanker 54, deflector 60 and X-Y stage 20 are coupled through a control interface 64 to a computer 66. An electron beam emitted from electron gun 50 scans on dry plate 14 under the control of computer 66.

FIG. 8 illustrates dry plate 14 disposed on X-Y stage 20. An electron beam 70 emitted from electron gun 50 delineates diffraction grating pattern 18 with dots 16 as units. Diffraction grating patterns 18 are sequentially delineated dot by dot, by moving X-Y stage 20.

Referring to FIG. 9, the operation sequence will be described below.

First, in step a, image data is scanned using an image scanner and is entered in the computer. Alternately, image data prepared by computer graphics may be entered in the computer. Then, the image data is corrected for better appearance in step b; this image correction is done because the scanned image data has rugged edge portions. Visual field data is entered in the computer in step c. This visual field data is used to determine, for each dot, the visible direction and visual field of a display attained by reproducing the input image data. The origin of the X-Y stage is then moved in step d and dot data of assigned address is input to the computer in step e. This dot data is associated with the location, color (spatial frequency), visible direction and visible range of one dot of the corrected image data. In step f, the pitch of a diffraction grating is determined so that the color of the dot input to the computer in step e can be reproduced. In the next step g, the direction of the diffraction grating is determined so that the visible direction of the dot input in step e can be reproduced. In the subsequent step h, the curvature of the diffraction grating is determined so that the visible range of the dot input in step e can be reproduced. The sequence of these steps f, g and h is not limited to the above particular one, but may be changed in any sequence. Then, in step i the X-Y stage is moved to the position of the dot input in step e, and in step j the diffraction grating for that dot is delineated. The delineation of the diffraction grating corresponding to one dot is completed through the above sequence of steps.

In the next step k, the address for referring to data is incremented by one in order to input data of the next dot. If image data at this address is found to exist in step l, the flow returns to step e where the next dot data is input to the computer, and the sequence of steps f to k is repeated. The overall sequence of steps is repeated until there exists no further image data corresponding to the dots.

With the use of such an electron beam exposing device, it is possible to scan a target with an electron beam in various directions, thus ensuring the delineation of a desired diffraction grating pattern. As shown in FIG. 10, by overlapping patterns respectively having spatial frequencies f1 and f2, a diffraction grating pattern with a mixture of spatial frequencies f1 and f2 can be formed. Such a diffraction grating pattern having a plurality of frequencies can express an intermediate color. Further, the direction of the diffraction grating can be changed dot by dot as shown in FIG. 11. In addition, diffraction gratings having different directions may be mixed in a single dot, as shown in FIG. 12. With the use of the patterns as shown in FIGS. 11 and 12, a display imaged can be changed depending on the viewing direction of a viewer.

Furthermore, as shown in FIG. 13, it is possible to form a dot having a curved diffraction grating, which can widen the visual field. It is also possible to form a dot with a concentric diffraction grating, which provides a 360-degree visual field and can eliminate the restriction on the visual field that is inherent to the prior art hologram. Accordingly, a viewer can view the display at any position or from any direction.

The use of the electron beam exposing device can provide a display with a greater number of expressions as compared with the case where two laser beams are used.

The dry plate having thus formed diffraction gratings can be used as a master plate for a copying occasion. The copying is executed using the well-known embossing method.

As described above, this embodiment can form dots with various diffraction gratings on the surface of a target plate, so that a display with the following various expressions can be provided.

(a) Since an image is constructed by the collection of dots having fine diffraction gratings with different spatial frequencies, illumination light reaches the eyes of a viewer without being diffused. Accordingly, a bright display can be provided.

(b) Since a pattern is formed by the combination of fine dots, color matching with an accuracy of less than 0.1 mm is possible. Accordingly, it is possible to prepare a fine pattern.

(c) It is possible to provide a diffraction grating pattern whose diffraction gratings have different directions. Accordingly, it is possible to provide a display whose pattern varies depending on the direction from which a viewer is viewing the display. Such a display can be provided more easily by using an electron beam exposing device.

(d) Since a dot is constructed by a curved diffraction grating pattern, it is possible to provide a display having a significantly wide visual field as compared with a conventional display. Such a display can be provided more easily by using the above-mentioned electron beam exposing device.

(e) Since a diffraction grating having a plurality of spatial frequencies is formed dot by dot, it is possible to provide a display showing an intermediate color. Such a display can also be provided more easily by using the electron beam exposing device.

What is claimed is:

1. A method for producing a display with a diffraction grating pattern, comprising the steps of:
   reading image data;
   assigning a color for a light exposure range and moving a slit of an optical system to a position corresponding to said assigned color;
   moving an origin of an x-y stage and setting initial data of said assigned color;
   reading data of an assigned address of said image data and opening a shutter of said optical system for light exposure when data of said assigned color exists;
   moving said x-y stage to increase said address by one and repeating said data-reading and shutter-opening step until no further data within said light exposure color range exists; and
   changing said assigned color for a light exposure range and repeating the above sequence of steps until no further light exposure data exists.

2. A method for producing a display with a diffraction grating pattern, comprising the steps of:
   reading image data;
   inputting visual field data to a computer;
   moving an origin of an X-Y stage;
   inputting an initial value of dot data;
   determining a pitch, direction and curvature of a diffraction grating based on said dot data;
   moving said X-Y stage to a position corresponding to said dot data based on the dot data;
   delineating said diffraction grating using an electron beam exposing device; and
   increasing an address corresponding to said dot data by one and repeating the above sequence of steps starting from said initial-value inputting step.

3. A display with a diffraction grating pattern comprising:
   a plane substrate; and
   a diffraction grating pattern formed on a surface of said substrate and divided into a plurality of minute dots, pitches and orientations of said dots and spatial frequencies of diffraction gratings formed in said dots being varied as desired, directions of said diffraction gratings being varied dot by dot.

4. A display with a diffraction grating pattern comprising:
   a plane substrate; and
   a diffraction grating pattern formed on a surface of said substrate and divided into a plurality of minute dots, pitches and orientations of said dots and spatial frequencies of diffraction gratings formed in said dots being varied as desired, each of said diffraction gratings being formed with curved lines.

5. A display with a diffraction grating pattern comprising:
   a plane substrate; and
   a diffraction grating pattern formed on a surface of said substrate and divided into a plurality of minute dots, pitches and orientations of said dots and spatial frequencies of diffraction gratings formed in said dots being varied as desired, each of said diffraction gratings having a plurality of spatial frequency components.

* * * * *